US012188429B2

(12) United States Patent
Bagnariol et al.

(10) Patent No.: US 12,188,429 B2
(45) Date of Patent: Jan. 7, 2025

(54) GO-KART WITH INTERNAL COMBUSTION ENGINE WITH ADJUSTABLE POWER

(71) Applicant: SODIKART, Coueron (FR)

(72) Inventors: Gilles Bagnariol, Nantes (FR); Alain Merian, La Chapelle Basse Mer (FR)

(73) Assignee: SODIKART, Coueron (FR)

( * ) Notice: Subject to any disclaimer, the term of this patent is extended or adjusted under 35 U.S.C. 154(b) by 0 days.

(21) Appl. No.: 18/263,243

(22) PCT Filed: Jan. 31, 2022

(86) PCT No.: PCT/EP2022/052231
§ 371 (c)(1),
(2) Date: Jul. 27, 2023

(87) PCT Pub. No.: WO2022/162226
PCT Pub. Date: Aug. 4, 2022

(65) Prior Publication Data

US 2024/0093650 A1 Mar. 21, 2024

(30) Foreign Application Priority Data

Jan. 29, 2021 (FR) ...................................... 2100875

(51) Int. Cl.
*F02D 9/02* (2006.01)
*F02D 9/10* (2006.01)
*F02D 31/00* (2006.01)

(52) U.S. Cl.
CPC ............ *F02D 9/1065* (2013.01); *F02D 9/02* (2013.01); *F02D 31/006* (2013.01); (Continued)

(58) Field of Classification Search
CPC ..... B60W 2540/10; B60W 2710/0605; B60W 2510/0671; F02D 9/00; F02D 9/02; (Continued)

(56) References Cited

U.S. PATENT DOCUMENTS 3,114,427 A * 12/1963 Thorner ................ B60K 31/00 123/378
4,099,592 A * 7/1978 Gonzales ............ B60K 31/102 123/360

(Continued)

FOREIGN PATENT DOCUMENTS

DE 3323304 C2 * 8/1990
DE 4220668 C1 12/1993

(Continued)

OTHER PUBLICATIONS

English translation of the Written Opinion of the International Searching Authority dated May 11, 2022 for corresponding International Application No. PCT/EP2022/052231, filed Jan. 31, 2022.

(Continued)

*Primary Examiner* — George C Jin
*Assistant Examiner* — Teuta B Holbrook
(74) *Attorney, Agent, or Firm* — David D. Brush; Westman, Champlin & Koehler, P.A.

(57) ABSTRACT

An internal combustion engine kart implementing an accelerator cable connecting an accelerator pedal and an operating lever rotating an air inlet flap controlling the amount of air entering the engine, and a controller receiving at least one control signal emitted by a remote transmitter. The kart includes a movable stop acting on the operating lever so as to change its range of movement and consequently a level of maximum opening of the air inlet flap. The movement of the movable stop depends on the control signal.

9 Claims, 6 Drawing Sheets

(52) U.S. Cl.
CPC ................ *F02D 2009/0208* (2013.01); *F02D 2009/0264* (2013.01); *F02D 2009/0296* (2013.01)

(58) Field of Classification Search
CPC ..... F02D 2009/0208; F02D 2009/0228; F02D 2009/023; F02D 2009/0264; F02D 2009/0218; F02D 2009/022; F02M 3/07; F16D 2500/3144; F16D 48/04
USPC .................... 74/513, 482, 481; 123/319, 376
See application file for complete search history.

(56) References Cited

U.S. PATENT DOCUMENTS

| | | | | | |
|---|---|---|---|---|---|
| 4,212,272 | A * | 7/1980 | Hawk | F02M 3/07 123/339.25 |
| 4,392,502 | A * | 7/1983 | Weston | F02D 11/105 123/352 |
| 4,811,809 | A | 3/1989 | Reinartz et al. | |
| 5,005,546 | A * | 4/1991 | Mann | F02M 3/07 123/339.1 |
| 5,354,234 | A | 10/1994 | Arold et al. | |
| 6,876,914 | B2 | 4/2005 | Dubois | |
| 7,509,205 | B2 * | 3/2009 | McLeod | B60K 31/00 477/91 |
| 2004/0199311 | A1 | 10/2004 | Aguilar et al. | |
| 2012/0272936 | A1 * | 11/2012 | Mason | F02M 19/02 123/438 |
| 2018/0001765 | A1 | 1/2018 | Langlet | |

FOREIGN PATENT DOCUMENTS

| | | | | |
|---|---|---|---|---|
| EP | 0589666 A1 | | 3/1994 | |
| EP | 3259149 B1 | | 10/2018 | |
| FR | 3008944 A1 | | 1/2015 | |
| FR | 3032656 A1 | * | 8/2016 | B60K 26/04 |
| IE | S20130017 A2 | * | 8/2013 | |
| IT | 1070657 B | * | 4/1985 | B60K 31/102 |

OTHER PUBLICATIONS

International Search Report dated May 11, 2022 for corresponding International Application No. PCT/EP2022/052231, filed Jan. 31, 2022.

Written Opinion of the International Searching Authority dated May 11, 2022 for corresponding International Application No. PCT/EP2022/052231, filed Jan. 31, 2022.

French Search Report and Written Opinion dated Oct. 5, 2021 for corresponding French Application No. 2100875, filed Jan. 29, 2021.

* cited by examiner

GO-KART WITH INTERNAL COMBUSTION ENGINE WITH ADJUSTABLE POWER

1. CROSS-REFERENCE TO RELATED APPLICATIONS

This application is a Section 371 National Stage Application of International Application No. PCT/EP2022/052231, filed Jan. 31, 2022, the content of which is incorporated herein by reference in its entirety, and published as WO 2022/162226 on Aug. 4, 2022, not in English.

2. FIELD OF THE INVENTION

The field of the invention is that of karting, and more particularly of the control of the power of the karts in use, for example within the framework of a gaming or "enhanced" practice.

More particularly, the invention relates to the implementation of such a control, for internal combustion engine karts (also called combustion karts hereafter).

3. PRIOR ART

The practice of karting has existed for many years. A kart is a very simple vehicle, generally based on a tubular chassis without suspension, essentially carrying a motorisation, a seat for the driver, a steering wheel to control the direction, and a crankset, comprising an accelerator pedal and a brake pedal. The motorisation can in particular be thermal or electric.

The practice of karting is done on a track, outdoor or, according to an approach that has been strongly developed, indoor. It is possible to distinguish competition karting and leisure karting, which is most often done by renting karts (for example for a series of tours over a period of 10 or 15 minutes), or in the form of animations, for example over half a day or an evening, which can bring together a group of friends, office colleagues . . . .

Generally, leisure karting is practiced in the form of one or more races, on the karting track. The users each drive a kart, and race, often for several laps of the track, the objective being of course for the driver to be the fastest, and therefore the first to cross the finish line.

This approach of competition between friends on rental karts satisfies many practitioners. However, there is a desire to expand the number of practitioners and to offer other approaches, in addition.

Are known, in the field of video games ("Mario Kart" (registered trademark) for example) games not limited only to a driving simulation: it may in particular be possible to obtain bonuses, for example by driving on an object appearing on the track, which will give them an increase in speed for some time, or on the contrary penalties which will cause them to lose speed for some time. It is also possible, sometimes, that a driver targets another kart, for example with a virtual missile, to make it slow down (penalty).

The applicant has proposed an approach allowing to apply similar enhancements in certain cases and for certain audiences with real karts, in particular by giving the possibility of obtaining an increase in speed (bonus) or on the contrary the possibility of applying a speed limit (penalty), to combine the reality of driving with the fun aspect of karting. The objects on the track leading to obtaining these bonuses or penalties can in particular be simulated by projections of images or light beams.

There are internal combustion engine karts and, more recently, electric motor karts. Both types of karts are regularly used for classic competitions (speed races).

On the other hand, the applications implementing enhancements are currently implemented on karts with electric motorisation. Indeed, the power of the electric motors is easily adjustable via an action of their electronic controllers: it is relatively simple to remote control the controllers to master an alteration or improvement in the performance and therefore the speed of the electric motorised kart. The maximum electrical power that the electric motor can provide is controlled, and this allows to produce the bonus or penalty effect simply and efficiently.

But, in the current state of technology, there is no solution to finely apply an order of degradation or increase in performance to a combustion kart engine, which is precise and constant, and it would be complex and expensive to develop a solution similar to that of electric motor karts.

Indeed, the remote management of the power of an internal combustion engine would require in particular an electronic control unit (ECU) with at least one input sensor connected to the accelerator pedal (or handle).

Such electronic control of the power of an internal combustion (or electric) engine kart should be completely secure, in particular to avoid the risk of jamming, in an acceleration position. This requires extremely reliable, redundant, complex systems as well as high quality components, which would necessarily induce significant costs.

However, it is in particular to avoid such costs that internal combustion engine karts can be favoured. Indeed, in addition to the fact that electric karts are not adapted for all implementations, they can prove to be relatively expensive due in particular to their cost of manufacture and maintenance, and in particular more expensive than internal combustion engine karts.

Furthermore, the time required to recharge the batteries of such karts requires having a substantial fleet of karts (even double the number of karts necessary) so as to compensate for these unavailabilities during recharging, which also generates a significant additional cost, which is not satisfactory either.

Finally, some tracks are already equipped with internal combustion engine karts, and do not wish to have to equip themselves with a second fleet or replace the fleet they have, but nevertheless wish to be able to offer fun applications, with the application of bonuses and penalties.

It would therefore be interesting to be able to use internal combustion engine karts to offer fun kart practice with these speed-related enhancements, in a simple and effective way.

Of course, this should be done without compromising comfort and driving sensations, or safety. In particular, in all circumstances, the behaviour of the kart should be safe and invariant when the driver releases or relieves the accelerator pedal, for safety.

Furthermore, it would be important to preserve, as much as possible, the driving sensations, and in particular the behaviour of the accelerator pedal, which must as far as possible remain identical in all situations.

The holder has proposed a solution, described in patent document EP3259149, in the form of a box comprising clamping means acting simultaneously on the maximum opening of the accelerator flap and on the tension of the accelerator cable. The accelerator cable circulates in a sheath, the position of which is variable in translation to change the clamping, under the action of an adjustment control movable in rotation. A spring acting in compression is mounted on the gas control, so as to be compressed when the gas control is in stop and the acceleration is continued.

This approach is interesting, but relatively technically complex, and difficult to assemble and adjust, in particular because of the adjustment in rotation, the number of parts, and the assembly of the spring mounted on the gas control.

There is therefore a need for a functional practical solution, which is simpler to implement, reliable and efficient for internal combustion engine karts, allowing to remotely control the maximum speed of the kart and therefore the maximum available power of the engine, and allowing to maintain good comfort and good driving sensations.

An exemplary embodiment of the invention provides answers to this need, and overcomes at least in part the disadvantages of the prior art.

4. SUMMARY

An exemplary embodiment of the invention meets this need by proposing a kart with an internal combustion engine, wherein said kart can receive bonuses or penalties, resulting respectively in an increase or a limitation of the available power, said kart implementing an accelerator cable connecting an accelerator pedal and an operating lever rotating an air inlet flap controlling the amount of air entering the engine, and control means receiving at least one control signal emitted by a distant transmitter.

The kart comprises a movable stop controlling the movement of said operating lever so as to change its range of movement and consequently a level of maximum opening of the air inlet flap, the movement of said movable stop being dependent on said control signal.

According to the invention, a compensation spring is mounted in the extension of said accelerator cable, between the accelerator cable or a slide driven by said accelerator cable and the operating lever, said compensation spring acting in tension to lengthen gradually when said operating lever is in contact with said movable stop and the driver continues to press said accelerator pedal, so that the ranges of movement of said accelerator pedal are identical regardless of the position of said stop.

Thus, this provides a particularly simple and effective assembly, compared to the prior art, the spring being mounted in the extension of the accelerator cable, to act in traction.

By implementing control means receiving a control signal and a stop which, depending on this signal or the absence of a signal, is movable so as to change the range of movement of the operating lever, the remote controlling of the performance of the engine of such a combustion kart proves to be relatively simple due to the number of elements involved in the effective implementation of these enhancements.

Furthermore, the fact of implementing elements which are mechanically or electronically not very complex allows to have a solution which represents a minimum production cost.

Furthermore, the fact that it is the level of maximum opening of the air inlet flap which is the adaptable parameter, and therefore the maximum power of the kart, allows such a kart to have all the necessary safety conditions. Indeed, and in any position of the stop, if the user releases the accelerator, the kart works in a traditional way and the slowing down will be done in the same way in all conditions. Therefore, it is the position of the stop which has a priority action on the user during the acceleration phases, but it is indeed the user who remains the priority to slow down by releasing the accelerator pedal.

In other words, in the racing phases where the user takes his foot off the pedal to slow down, this kart operates in the same way as a traditional kart. On the other hand, in the racing phases where the user presses the pedal to accelerate, the kart can, depending on the position of the stop, authorise the total or partial power of the engine.

A change in position of the stop defines a change in the level of maximum opening of the air inlet flap and consequently a change in the maximum power, but does not preclude a reduction in power. In other words, the invention has a "unidirectional aspect": when accelerating, the driver can accelerate, that is to say "press" the pedal, but it is the controlling means which set the maximum power; on the other hand, to slow down, the kart works conventionally. Thus, for slowing down the kart, the driver has priority (it is he who decides, by releasing the accelerator).

According to one aspect of at least one embodiment of the invention, a compensation spring is mounted between the accelerator cable or a slider driven by said accelerator cable and the operating lever, so that the ranges of movement of said accelerator pedal remain substantially unchanged regardless of the state of the stop. The driver can move the pedal over its entire travel (it is not blocked in an intermediate position that could surprise or hinder the driver), although the controlling means set the maximum power (the movement of the pedal at the end of its travel, may be inoperative when opening the shutter).

In this way, regardless of the position of the stop, the ranges of movement of the accelerator pedal will be identical for the user. This allows him in particular to better control the decelerations because the action of partially or totally lifting the foot from the accelerator pedal to regulate its deceleration remains unchanged regardless of the position of this stop.

According to one aspect of at least one embodiment of the invention, the kart comprises a feedback loop controlling the position of said movable stop, depending on information representing the instantaneous power and/or the instantaneous speed of said kart.

Thus, the position of the stop can be adjusted permanently, precisely, to maintain a determined maximum power or speed of the kart.

According to one aspect of at least one embodiment of the invention, said movable stop is mounted at the end of a piston whose movement is controlled by said control means receiving said control signal.

According to one aspect of at least one embodiment of the invention, said operating lever is movable in rotation about a first axis of rotation.

According to one aspect of at least one embodiment of the invention, said first axis of rotation is common with a second axis of rotation of said air inlet flap.

This allows to simplify the mechanical assembly of such a kart and therefore its implementation on pre-existing karts.

According to one aspect of at least one embodiment of the invention, said control lever has a first end connected to said compensation spring and a second end that can contact said movable stop.

According to one aspect of at least one embodiment of the invention, the internal combustion engine kart is intended for fun applications, wherein said kart can receive bonuses or penalties, resulting respectively in an increase or a limitation of the power available, said stop being able to assume at least three states:

- an intermediate state, corresponding to an intermediate level of maximum speed, applied in the absence of a control signal assigning a bonus or a penalty;

- a state of penalty, corresponding to a reduced level of maximum speed, said reduced level being lower than said intermediate level, and applied in the presence of a control signal assigning a penalty;
- a state of bonus, corresponding to an increased level of maximum speed, said increased level being greater than said intermediate level, and applied in the presence of a control signal assigning a bonus.

The kart of the invention adjusts accordingly, for example permanently via a feedback loop, the stop position adapted to maintain the desired state.

According to one embodiment of the invention, said movable stop acts on said operating lever by means of a tie rod so as to change its range of movement and consequently said maximum opening level of said air inlet flap.

According to one embodiment of the invention, said control means comprise an actuator connected to said movable stop by means of a connecting rod, the movement of said actuator being controlled by said control means receiving said control signal.

5. BRIEF DESCRIPTION OF THE DRAWINGS

Other advantageous features of the invention will appear more clearly upon reading the following description of an embodiment of the invention, given by way of a simple illustrative and non-limiting example and the appended drawings, among which:

6. DESCRIPTION OF AN EMBODIMENT

6.1 Conventional Accelerator Control System

Figure 1:
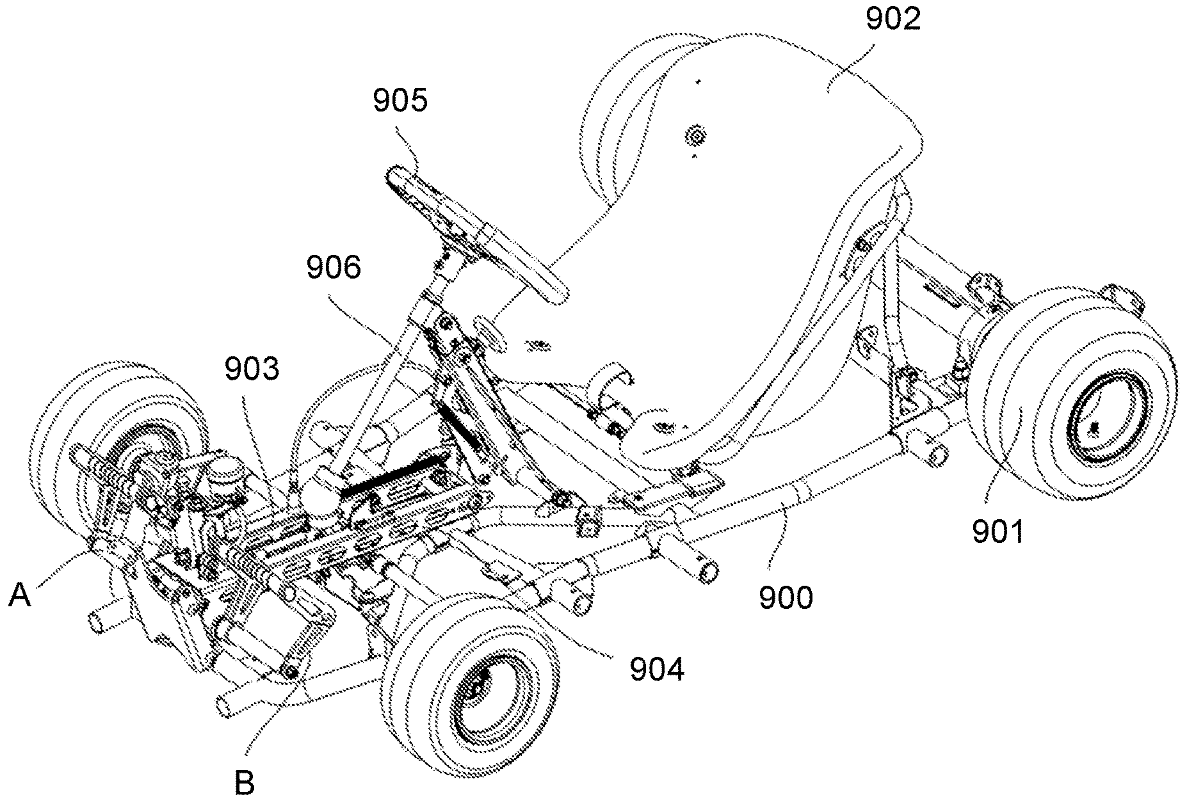
FIG. 1 is a perspective view of an example of combustion kart.

FIG. 1 shows a perspective view of an example of combustion kart that can implement the invention. It conventionally comprises a chassis 900, four carrying wheels 901 and equipped with a seat 902 wherein the driver of the kart sits. A pedal assembly 903 carries an accelerator pedal A and a brake pedal B. This pedal assembly can be slidably mounted on a central beam 904 integral with the chassis 900. In variants, the pedals can be replaced by other actuators, for example steering wheel paddles. The steering wheel 905 is mounted on a steering column 906, acting here on the front wheels. An internal combustion engine (not shown) drives the rear wheels.

Figure 2:
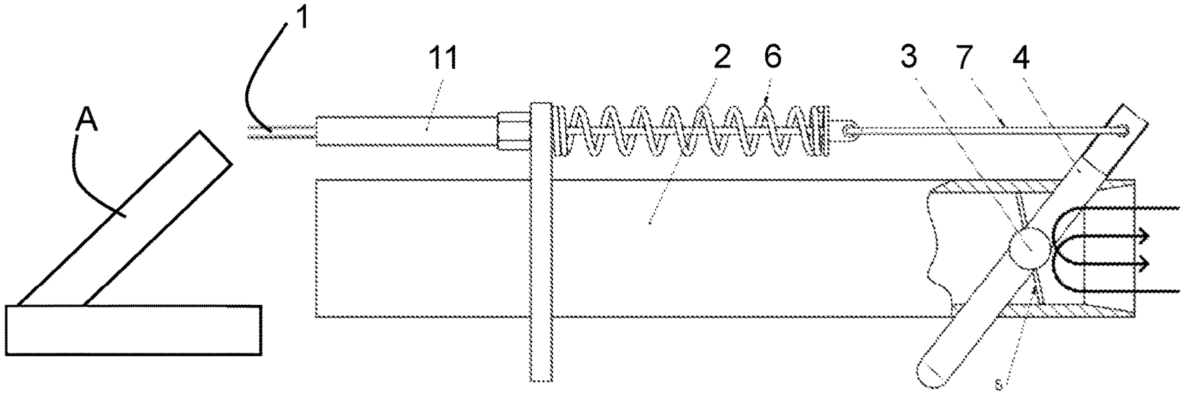
FIG. 2 illustrates the known mode of operation of a power management system of the engine of FIG. 1, the flap being in the closed position.
Figure 3:
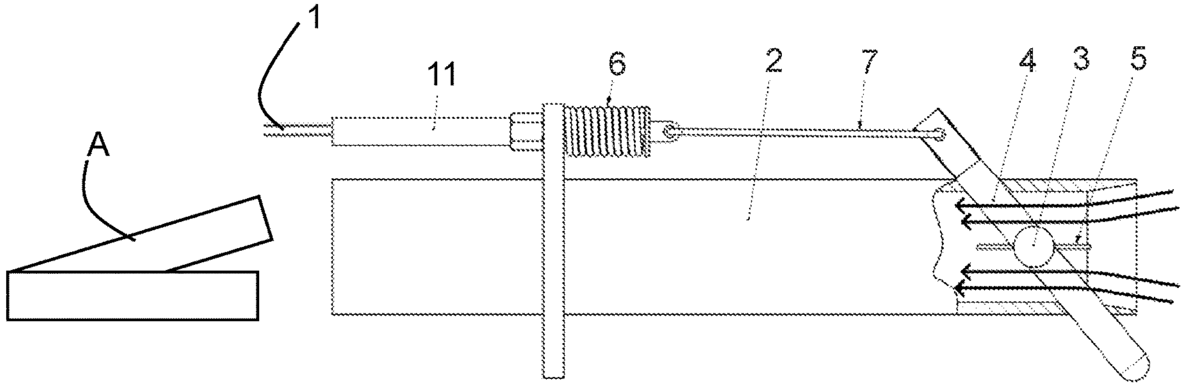
FIG. 3 illustrates the known mode of operation of a power management system of the engine of FIG. 1, the flap being in the open position.

FIGS. 2 and 3 illustrate the known mode of operation of an accelerator management system, the action on the pedal being transmitted to the air inlet flap via a cable (or rod). This flap is in the closed position (FIG. 2) and in the open position (FIG. 3).

As illustrated in FIGS. 2 and 3, a conventional system for controlling the accelerator of a combustion kart implements an accelerator cable 1, circulating in a sheath 11, and connecting an accelerator pedal A and an operating lever 4. This operating lever 4 has the role of rotating an air inlet flap 5 controlling the amount of air which enters the engine via an air duct 2.

Here, the operating lever 4 is rotatably mounted around a first axis of rotation 3. In this embodiment, this first axis of rotation is common with the axis of rotation (second axis) of the air inlet flap 5.

The more the shutter is open, that is to say the greater the amount of air entering the engine, the higher the power delivered by the engine, and therefore the speed. Indeed, the power of an internal combustion engine is in particular related to the flow of air penetrating into the engine and therefore to the opening of the air inlet flap 5.

By pressing the accelerator pedal A, the accelerator cable 1, circulating in the sheath 11, pulls the operating lever 4 of the air inlet flap 5 and opens the latter.

By raising the accelerator pedal A to slow down, the accelerator cable 1 is released, the lever closes the flap and the power drops.

A return spring 6, connected to the accelerator cable 1, tends to bring the lever back to the “shutter closed” position when the pedal is released. This return spring 6 is here connected to a rod 7 allowing to take up the forces exerted by the accelerator pedal and to transmit them to the operating lever 4 with which this rod 7 is in contact.

When accelerating, in particular fully accelerating, the return spring 6 is compressed (FIG. 3). By raising the accelerator pedal A to slow down, the accelerator cable 1 is released, the return spring 6 then pushes back the rod, which then pushes the operating lever and closes the shutter (FIG. 2). The power is reduced.

FIG. 2 illustrates a conventional accelerator control system when the air inlet flap 5 is in the closed position. As illustrated in this figure, the return spring 6 is released and exerts a force on the operating lever 4.

The air inlet flap 5 is, under the action of the lever 4, pivoted in a plane not parallel, and almost perpendicular, to the axis of the air duct 2 and allows an amount of air which is minimum or even zero to pass so that the engine power is greatly reduced.

This position of the air inlet flap corresponds to a position wherein the driver does not press the accelerator pedal A.

FIG. 3 illustrates a conventional accelerator control system when the air inlet flap 5 is in the open position. As illustrated in this figure, the return spring 6 is compressed to a maximum under the pulling action of the cable 1 connected to the pedal A, which is pressed, and controls, via the rod 7, the movement of the operating lever 4.

The air inlet flap 5 is pivoted in a plane parallel to the air duct 2 and allows a maximum amount of air to pass into the duct so that the engine power is maximum.

When the pedal is released, the return spring 6 relaxes (more or less depending on the position of the pedal) and the lever 4 moves accordingly, controlling accordingly the level of opening of the flap 5, and therefore the power delivered by the engine.

6.2 Maximum Power Management System

The general principle of the invention is based on the implementation of a simple, reliable, effective and inexpensive solution for an internal combustion engine kart to act remotely on the maximum speed of the kart.

The embodiments described correspond to fun applications, wherein the kart can in particular receive bonuses or penalties, resulting respectively in an increase or a limitation of the available power (and therefore of the maximum speed).

This increase or this limitation of the power available is based in particular on the implementation of a stop acting on an operating lever of the air inlet flap and which can take several positions (incremented or continuously variable) so as to change the range of movement of this operating lever and consequently change the level of maximum opening of the air inlet flap, thus allowing to vary the maximum power available of the engine of the kart.

In particular, possible “states” can be defined for the stop corresponding to orders received from a server or a remote control, corresponding for example to a reduced speed state (the kart is subject to a penalty, during a time lapse), a standard speed state (which does not correspond to the maximum power available), and an increased speed state (the kart benefits from a bonus).

These states of the stop, and therefore the maximum opening of the flap, are adjusted depending on a control signal received in the kart by reception means and emitted by a remote server and/or another kart. The control signal received drives control means capable of moving the stop so that it assumes the desired position corresponding to the controlled state.

This state of the stop corresponds to a maximum level of opening of the inlet flap: depending on the position of this flap, the air inlet will be more or less reduced or increased, and a specific maximum level of power, therefore of speed, will be available.

In a simplified version, the signals received correspond directly to the desired state, and the stop then assumes a corresponding predefined position. However, in this case, the maximum speed available may vary significantly, depending on various criteria including the setting and the specific features of the engine, the weight of the driver, the track conditions . . . ). For more precision, and so that the states correspond to a given maximum speed, it is possible to finely vary the position of the stop, in particular using a feedback loop, according to the measured speed of the kart (either by the kart itself, or by a remote system, which then sends instructions on a regular basis to reduce or increase the maximum speed, by moving the stop accordingly).

It should be noted that the controlled movement has priority for closing the shutter on the driver's request to open it. In other words, even if the driver continues to accelerate (by “crushing the accelerator pedal” for example), the stop ensures that, once the maximum power (corresponding to a selected state) has been reached, the kart cannot accelerate more (it is restrained). Conversely, essentially for safety reasons, the driver remains the priority to slow down the kart by releasing the accelerator pedal. In the phases where the driver takes his foot off the accelerator pedal to slow down, the system of the invention operates in the same way as a traditional conventional kart system ensuring maximum safety for the driver.

In the phases where the driver presses the accelerator pedal to accelerate, the system, in particular the stop, can therefore, depending on the programming of its remote control (which emits the control signal) authorise the total or partial power of the engine.

Preferably, the signal received can only have the effect of closing the air flap, that is to say that an uncontrolled manoeuvre or a malfunction of the control means can only have the effect of reducing the maximum power of the engine, thus ensuring maximum safety for the kart and the driver. For example, the stop being mounted at the end of a piston, the latter is designed so that by default (and therefore in the event of a system failure) it places the stop in the position delivering the lowest maximum power (corresponding to a state of penalty for example).

In addition to safety, it is also desirable to ensure comfort and driving sensations. To prevent the action of the stop from resulting in a reduction in the travel of the acceleration pedal (or of another actuator, for example a handle), a compensation spring is provided, replacing the rigid rod 7 of the prior art. Thus, when the lever 4 contacts the stop 9, depending on the position of the latter, the movement of the accelerator pedal A remains possible: the driver can continue to “accelerate”, that is to say to act on the accelerator pedal A, but this does not result in real acceleration (the flap cannot be opened further). It is the compensation spring 8 which supports the additional movement of the accelerator pedal A, without this having any effect on the power delivered by the engine.

In this way, the range of movement of the accelerator pedal remains the same, regardless of the state of the stop.

The compensation spring 8 is placed in series with the accelerator cable 1, that is to say in the extension thereof. In the embodiments described below, it replaces the rod 7 of the prior art (FIGS. 2 and 3). In other variants, it can be placed close to the accelerator pedal, or be associated with a rod whose size would be reduced.

In other embodiments, the accelerator cable and its sheath can be replaced by a rod.

A first embodiment of the invention is now presented in more detail, in relation to FIGS. 4 to 8.

Figure 4:
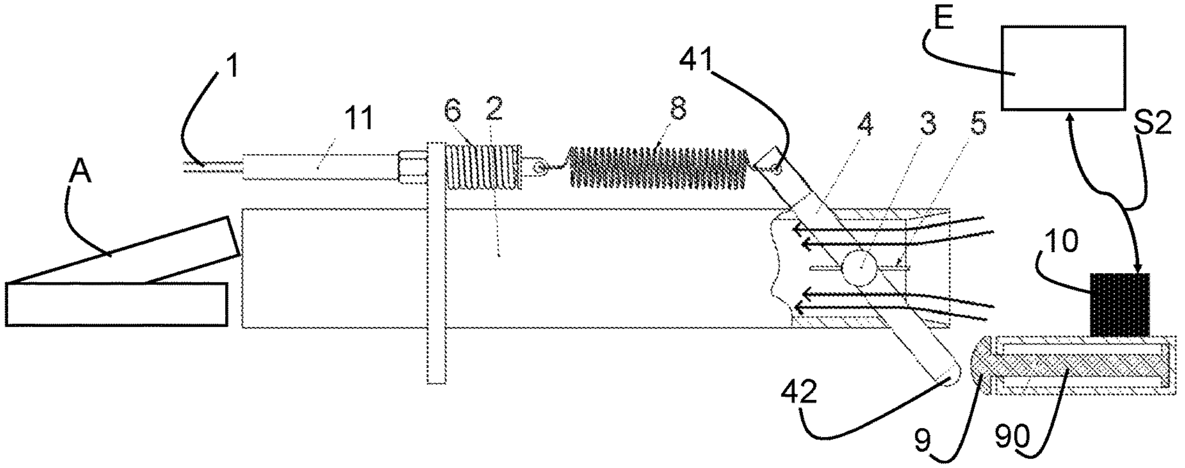
FIG. 4 is a schematic side view of a combustion kart according to one embodiment of the invention, wherein the movable stop is in a state of bonus.
Figure 5:
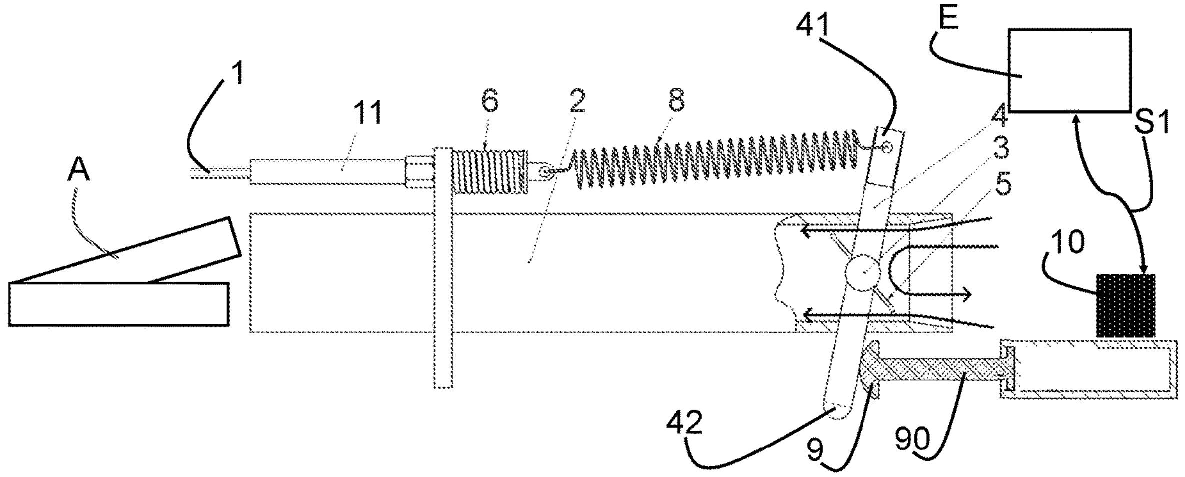
FIG. 5 is a schematic side view of a combustion kart according to the embodiment of FIG. 1, wherein the movable stop is in a state of penalty.

As illustrated in FIGS. 4 and 5, the kart implements an accelerator cable 1 connecting an accelerator pedal A and an operating lever 4. This operating lever 4 has, as for a conventional system, the role of rotating an air inlet flap 5 controlling the amount of air which enters the engine through an air duct 2.

Here, the operating lever 4 is rotatably mounted around a first axis of rotation 3. In this embodiment, this first axis of rotation is common with the axis of rotation (second axis) of the air inlet flap 5.

The fact that the first axis of rotation of the operating lever and the second axis of rotation of the air inlet flap are merged allows to gain in compactness of the system as well as in simplification due to the fact that a single mechanical axis is present. Other assemblies of the lever can however be considered. In particular, embodiments could be provided wherein the first axis of rotation of the operating lever and the second axis of rotation of the air inlet flap are distinct.

According to the invention, the internal combustion engine kart comprises a movable stop 9 which can act on the operating lever 4, and control means 10 receiving at least one control signal emitted by a remote transmitter E.

According to the invention, this movable stop 9 can act on the operating lever 4 so as to change its range of movement and of pivoting around the first axis of rotation 3. In this way, by changing the range of movement of the operating lever 4, the maximum opening level of the air inlet flap 5, and therefore the maximum engine power, are changed. This change of the range of movement of the operating lever 4 depending on a state of the movable stop 9 is carried out depending on the control signal received by the control means 10 and influencing the position of the movable stop.

In this embodiment, the movable stop 9 is mounted at the end of a piston 90 whose movement is controlled by the control means 10 receiving the control signal. Therefore, it is the movement of the piston 90 which moves the movable stop according to at least three states:

- an intermediate state P0, corresponding to an intermediate level of maximum speed, applied in the absence of a control signal assigning a bonus or a penalty;
- a state of penalty P1, corresponding to a reduced level of maximum speed, said reduced level being lower than said intermediate level, and applied in the presence of a control signal S1 assigning a penalty;
- a state of bonus P2, corresponding to an increased level of maximum speed, said increased level being greater than said intermediate level, and applied in the presence of a control signal S2 assigning a bonus.

Of course, other states can be defined, between the state of bonus P2 and the state of penalty P1. Each state corresponds to a maximum speed, which is regulated by the position of the stop.

According to this first embodiment, the kart further comprises a compensation spring 8 mounted between the accelerator cable 1 and the operating lever 4 and acting in traction, so that the ranges of movement of the accelerator pedal A are identical in the at least three states P0, P1, P2.

More particularly, this compensation spring 8 is connected to the control lever 4 via a first end 41 of this operating lever 4, the second end 42 of this operating lever 4 being able to contact the movable stop 9 regardless of its position.

In other words, the accelerator cable no longer pulls directly on the operating lever, but pulls on one end of the compensation spring. It is the other end of the compensation spring which pulls on the operating lever in order to open the air inlet flap 5. This spring allows not to block the movement of the cable, and therefore of the pedal, even when the movement of the lever, and therefore of the rod, is blocked by the stop. Thus, the driver keeps the same sensations at the pedal, regardless of the state (penalty, standard, bonus . . . ) and the position of the stop.

As illustrated in FIGS. 4 and 5, this compensation spring is connected to the acceleration cable 1 through the conventional return spring 6. When accelerating, in particular fully accelerating, the return spring 6 is compressed regardless of the state of the movable stop. In other words, this return spring always acts in the same way regardless of the state of the movable stop 9, while the compensation spring can be stretched more or less significantly depending on the position of the movable stop 9.

In this way, regardless of the position of the movable stop, the behaviour of the user towards the accelerator pedal does not change, which allows him to better control his driving of the kart, in particular during the deceleration phases, that is to say when he has to partially lift his foot. The driver thus always feels the same sensations "on the pedal".

Figure 8:
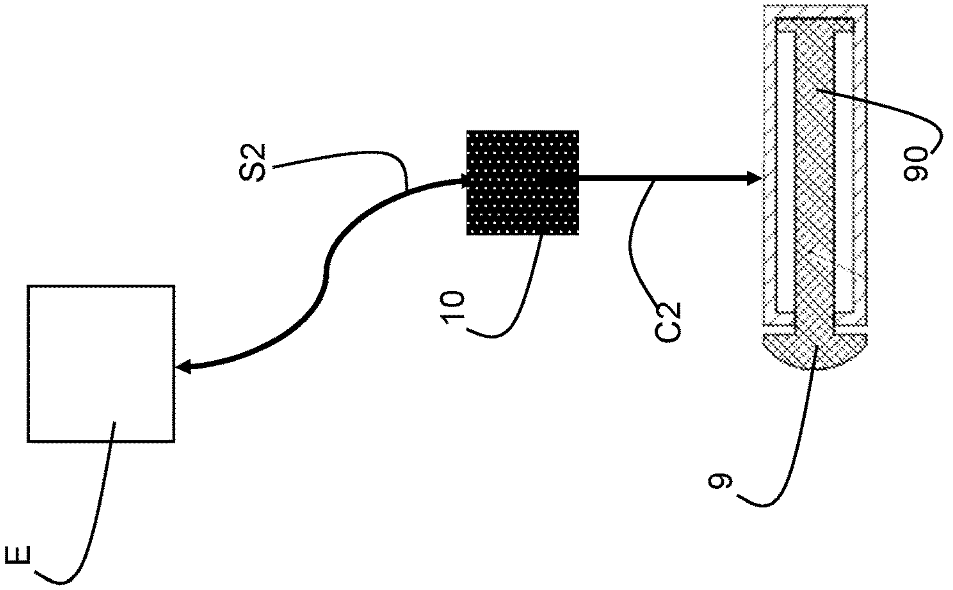
FIG. 8 is a schematic view detailing the switching of the movable stop in the bonus position.
Figure 7:
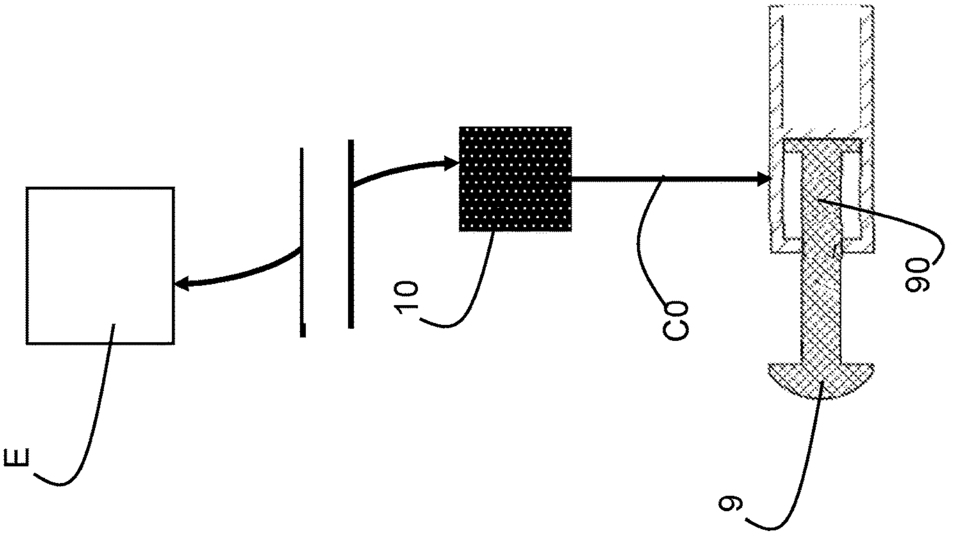
FIG. 7 is a schematic view detailing the switching of the movable stop in the intermediate position.
Figure 6:
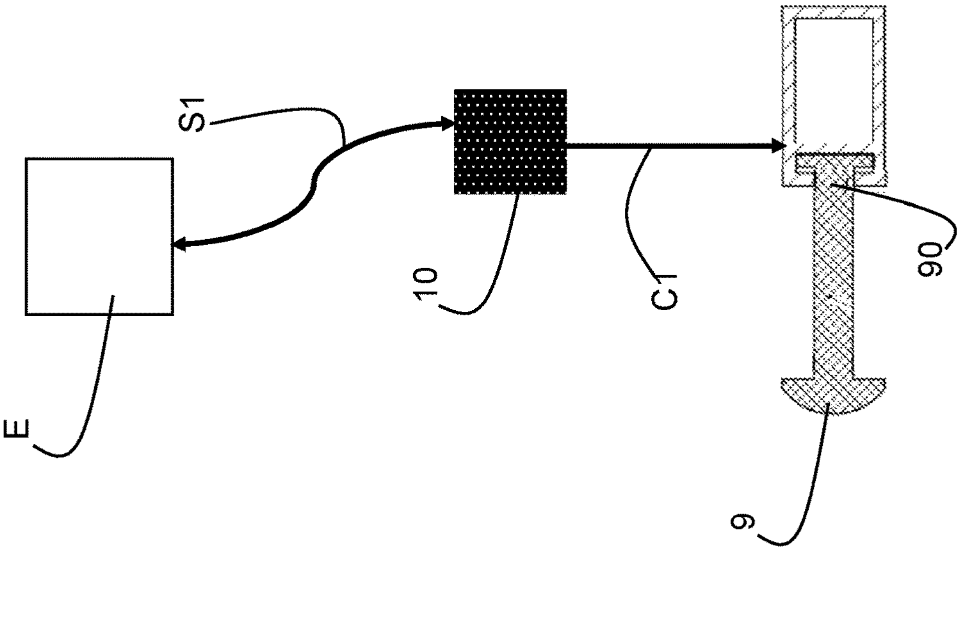
FIG. 6 is a schematic view detailing the switching of the movable stop in the penalty position.

The switching in positions corresponding to the three states of the movable stop 9 is now shown in relation to FIGS. 6 to 8.

FIG. 7 shows the switching of the movable stop 9 into an intermediate, or standard, state, P0, corresponding to an intermediate level of maximum opening NO of the air inlet flap 5. In this case, provision can be made for the remote transmitter E to not emit any signal granting a bonus or a penalty. In the absence of a signal, these control means emit a control instruction C0 so that the movable stop 9 switches into an intermediate state P0, corresponding to an intermediate opening level of the air inlet flap 5. In this way, the power of the engine is not changed with respect to a power under normal conditions.

Alternatively, a signal periodically confirming the state being applied, or a decrease or increase in the maximum opening of the shutter for precise adjustment, can be implemented. Thus, according to one embodiment, the kart can implement a feedback loop controlling the position of the movable stop 9 corresponding to the states P0, P1, P2, depending on information representing the instantaneous power and/or the instantaneous speed of the kart.

This representative information can for example be a speed of rotation of the drive wheels or a speed determined by geolocation means.

FIG. 6 shows the switching of the movable stop 9 into a state of penalty P1, corresponding to a reduced maximum opening level N1 of the air inlet flap 5. For this purpose, the remote transmitter E emits a control signal S1 assigning a penalty which is received by the control means 10. These control means emit a control instruction C1 so that the movable stop 9 switches into a position corresponding to this state of penalty P1, corresponding to a reduced maximum opening level N1 of the air inlet flap 5, lower than the intermediate level thereof. In this way, the engine power also turns out to be reduced.

This switching into a state of penalty is performed by movement of the piston 90 to a maximum position wherein the piston is deployed to a maximum outside the housing of this piston.

According to one embodiment of the invention, the control means can be provided with a timer so that after a predefined time lapse, the control means emit a control instruction C0 so that the movable stop returns to a position corresponding to the intermediate state P0.

FIG. 8 shows the switching of the movable stop 9 into a state of bonus P2, corresponding to an increased maximum opening level N2 of the air inlet flap 5. For this purpose, the remote transmitter E emits a signal control S2 assigning a bonus which is received by the control means 10.

These control means emit a control instruction C2 so that the movable stop 9 switches into a state of bonus P2, corresponding to an increased maximum opening level N2 of the air inlet flap 5, greater than the intermediate level thereof. In this way, the power of the engine also turns out to be increased.

This switching into a state of bonus is performed by sliding the piston 90 to a position wherein the movable stop is to a maximum retracted.

It should be noted that, according to one embodiment of the invention, if the movable stop is already in a state of bonus P2, the control means do not emit a new control instruction to switch to a state of bonus.

According to one embodiment, a return to the standard state can be decreed after a predefined time lapse without any signal having been received.

The control means can be electronically regulated by means of a feedback loop which regulates the position of the movable stop 9, depending on information representing the instantaneous power and/or the instantaneous speed of the kart.

Thus, this allows to ensure precise adjustment, by checking that the position of the stop is consistent with a speed of the kart and/or control information received continuously.

To further illustrate the bonus and penalty states, the position of the various constituents of the kart in these states will now be detailed in relation to FIGS. 4 and 5.

FIG. 4 illustrates the kart when the movable stop 9 is in a state of bonus P2. As already described, this state corresponds to an increased maximum opening level N2 of the air inlet flap 5. As illustrated in this figure, the compensation spring 8 is at rest, no force being exerted on the operating lever 4 at the end 41. Moreover, the movable stop 9 is retracted to a maximum and does not exert any force on the operating lever 4 at the end 42 either.

As illustrated, the air inlet flap is placed in a plane parallel to the air duct 2 and allows the maximum amount of air to pass so that the engine power is maximum when the accelerator pedal is fully pressed.

FIG. 5 illustrates the kart when the movable stop 9 is in a state of penalty P1.

As already described, this state corresponds to a reduced maximum opening level N1 of the air inlet flap 5. In this state, the air inlet flap 5 is pivoted in a plane not parallel to the air duct 2, when the accelerator pedal is fully pressed, and passes a reduced amount of air so that the engine power is reduced.

As illustrated in this FIG. 5, the movable stop 9 is extended and exerts a force on the operating lever 4 at the end 42. This exerted force limits the pivoting of the operating lever 4 which stretches, or lengthens, the compensation spring 8 which is actually stretched when the accelerator pedal is pressed. The movement ranges of the accelerator pedal thus remain identical in the different states, while the maximum opening of the flap varies.

Figure 11:
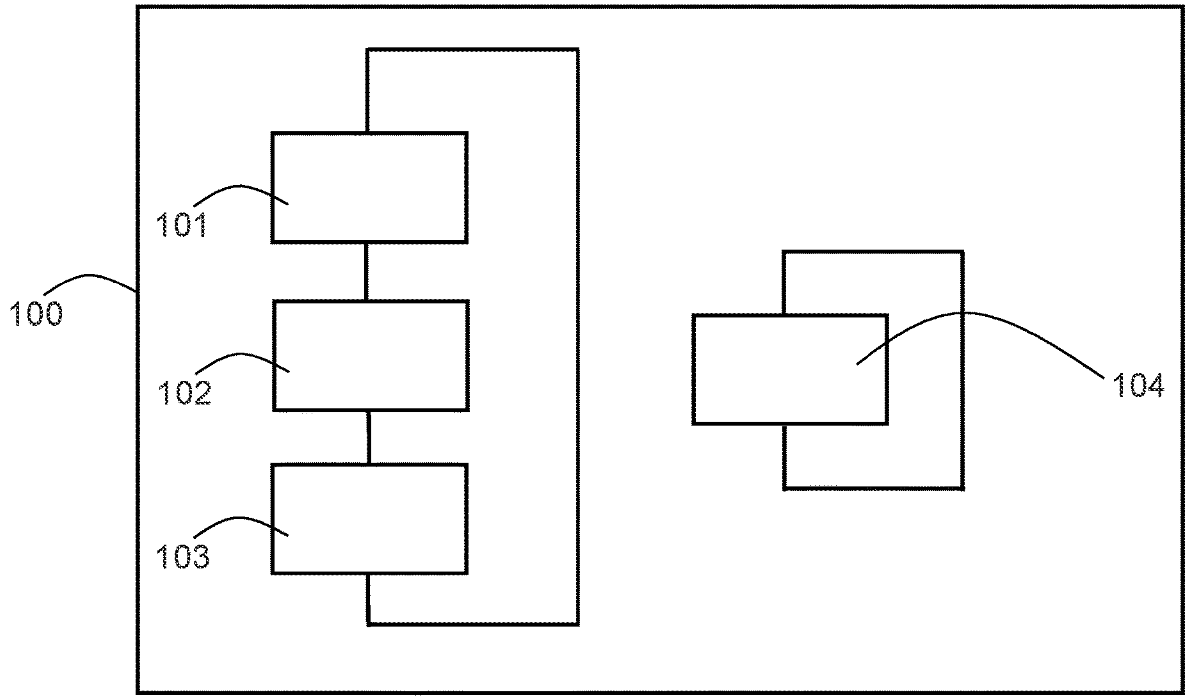
FIG. 11 is a diagram illustrating the method for controlling a combustion kart according to one embodiment of the invention.

The corresponding controlling method will now be presented in relation to FIG. 11. As illustrated, this method in particular comprises the following steps, implemented in the kart:

- receiving 101 at least one control signal S1, S2 emitted by the remote transmitter E, representing a bonus or a penalty, corresponding respectively to an increase or a limitation of the available power,
- actuating 102 the movable stop 9 acting on the operating lever 4 rotating the air inlet flap 5 controlling the amount of air entering the engine, so as to change the range of movement of the operating lever 4 and consequently the maximum opening level NO, N1, N2 of the air inlet flap 5, depending on the control signal S1, S2.

In connection with FIG. 5, and to reach the position illustrated in this figure, the method for controlling the combustion kart so as to subject the kart to a penalty comprises the following steps:

- receiving 101 at least one control signal S2 emitted by the remote transmitter E, representing a penalty, corresponding to a limitation of the available power,
- actuating 102 the movable stop 9 towards a position corresponding to the state of penalty P1, so as to change the range of movement of the operating lever 4 and consequently a level of maximum opening of the air inlet flap 5.

In connection with FIG. 4, and to reach the position illustrated in this figure, the method for controlling the combustion kart so as to submit a bonus to the kart comprises the following steps:

- receiving 101 at least one control signal S1 emitted by the remote transmitter E, representing a bonus, corresponding to an increase in the available power,
- actuating 102 the movable stop 9 towards a position corresponding to the state of bonus P2, so as to change the range of movement of the operating lever 4 and consequently the level of maximum opening of the air inlet flap 5.

Furthermore, in this embodiment, the kart controlling method comprises a step 103 of compensating for a limitation of the movement of the operating lever 4, carried out using the compensation spring 8 mounted between the accelerator cable 1 and the operating lever 4.

In this way, the accelerator pedal A remains movable over a single predefined movement range.

As illustrated in FIG. 11, this kart also comprises a step 104 of regulating the state of the movable stop 9, depending on information representing the instantaneous power and/or the instantaneous speed of the kart.

Thus, this allows to provide additional security by checking that the position of the stop is consistent with a speed of the kart, and to alert on possible maintenance needs of the kart.

Such a regulation step can for example be implemented regularly, or according to a given time lapse.

This controlling method can be implemented for controlling a plurality of combustion karts in the context of a fun application. Each kart receives controls from a server, by adapted radio communication. The server can have location data for each kart, and determine the actions (penalty, bonus, . . . ) according to various criteria (action of the kart or of another kart, decision by a third party or the public, decision of the track manager, random treatment . . . ).

As described previously, such karts, as well as the corresponding method, in particular have fun applications. The invention can also be implemented for applications of improving racing conditions, for example the simulation of a lead box (a lead box allows to receive weights of lead, allowing to ballast the kart, to balance performance, for example according to the weights and/or the levels of the drivers), of standardising the performance of the karts of a fleet of combustion karts (the engines are often noticeably disparate from one kart to another, in terms of performance), of safety (slowing down a dangerous kart, or a fleet of karts).

The invention can also allow to adapt the power according to the age (for example to allow a child to drive a kart for an adult, the power being reduced compared to the same kart when an adult uses it).

6.3 Second Embodiment of the Invention

Figure 9:
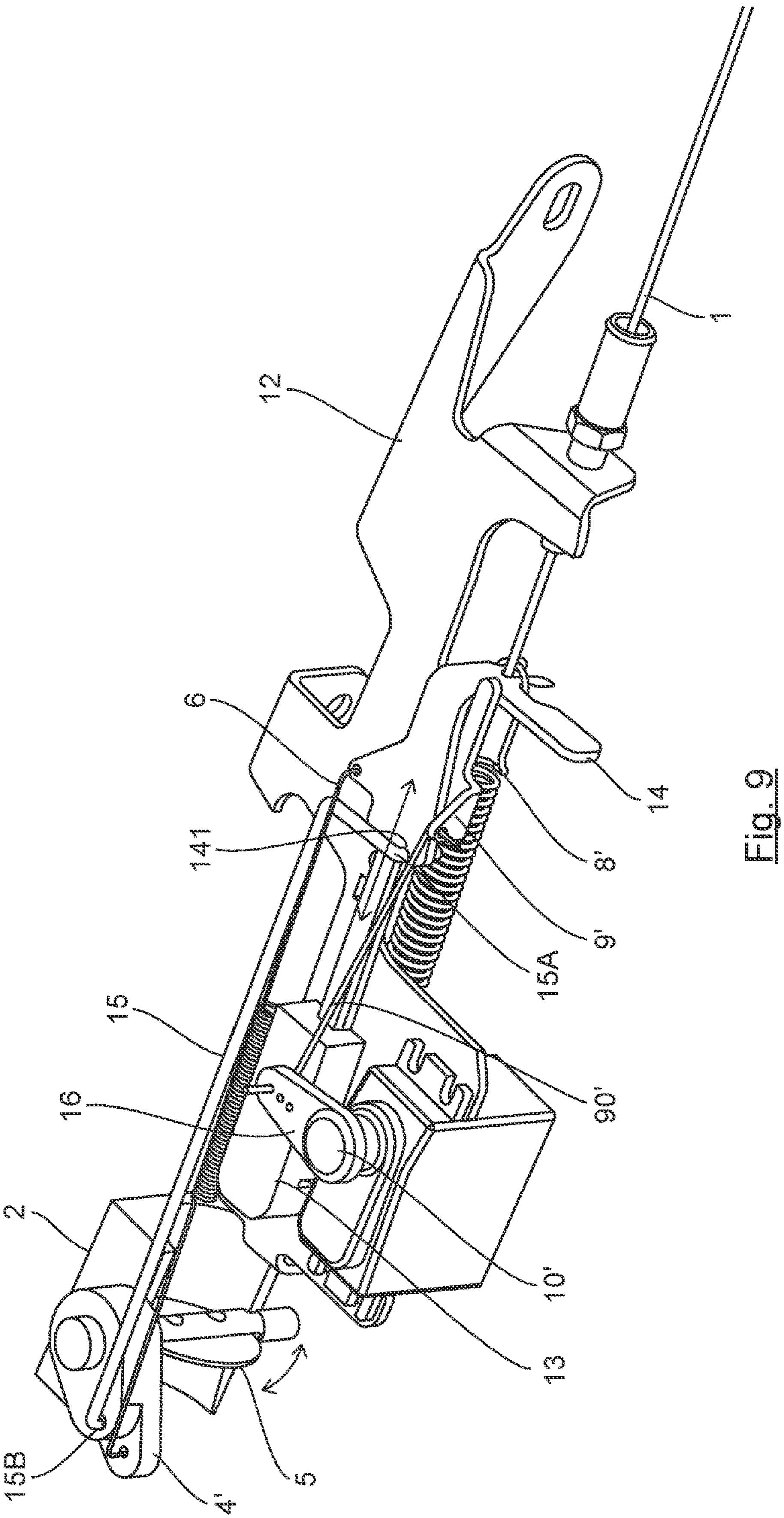
FIG. 9 is a perspective view of a combustion kart according to another embodiment of the invention wherein the movable stop is in an intermediate state, at idle, pedal lifted.
Figure 10:
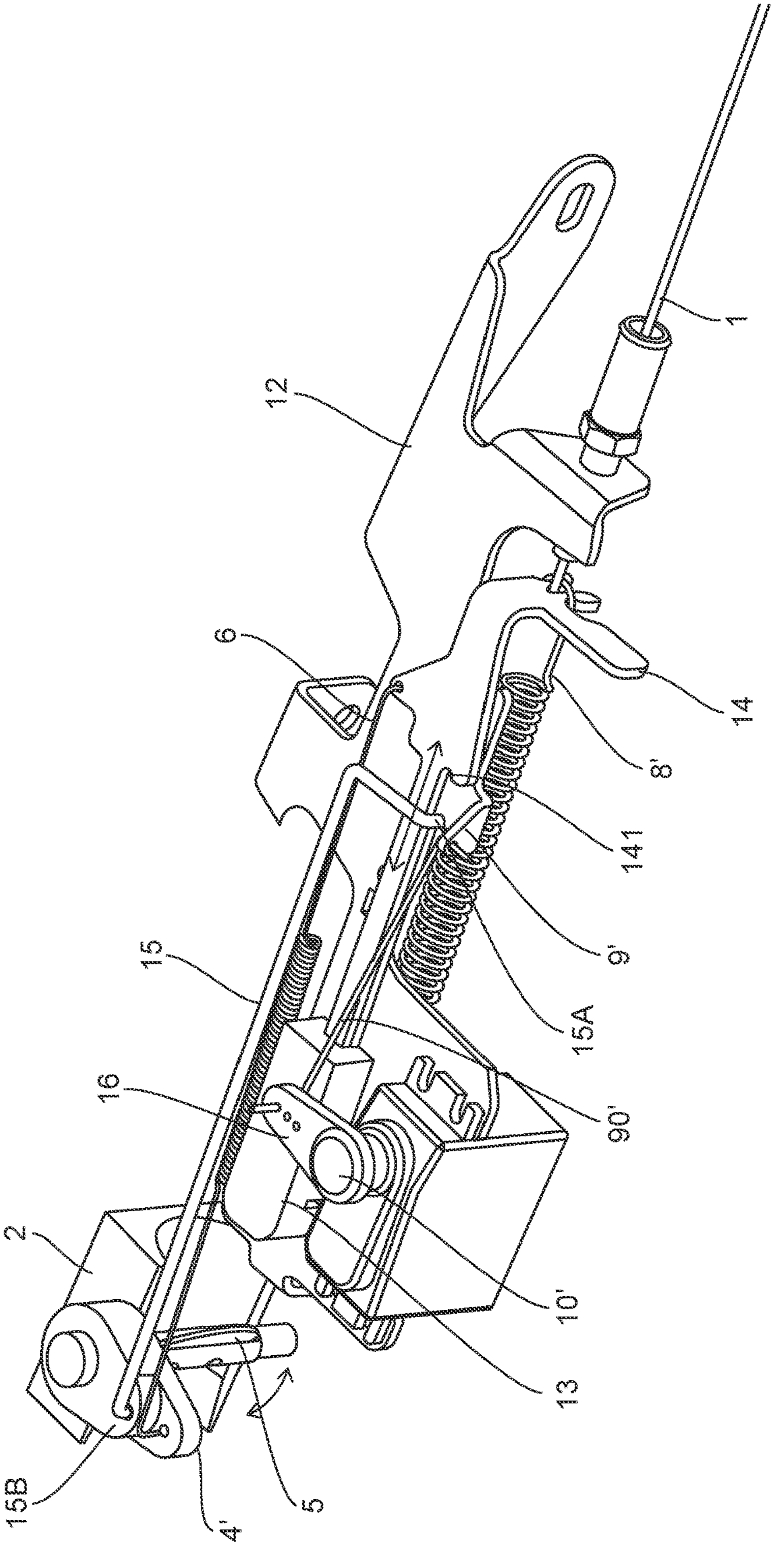
FIG. 10 is a perspective view of a combustion kart according to the embodiment of FIG. 9 wherein the movable stop is in an intermediate state, pedal fully accelerated.

FIGS. 9 and 10 illustrate the means for controlling the opening of the flap 5 of a combustion kart according to a second embodiment of the invention. In these FIGS. 9 and 10, the movable stop is in an intermediate state, the cable being released (accelerator pedal released) in FIG. 9, and pulled (accelerator pedal pressed) in FIG. 10.

In this second embodiment, the movable stop 9' does not act directly on the operating lever 4', which is the case in the first embodiment shown, but indirectly, by means of a tie rod 15 connected to the operating lever 4', so as to control the range of movement of the latter and consequently the level of maximum opening of the air inlet flap 5. In this embodiment, the control means comprise an actuator 10' movable in rotation (and no longer a piston) able to move a controlling lever 16 in rotation, according to the desired state. A precise position of this controlling lever can be obtained, depending on the controls received by the actuator 10), to move it angularly. The free end of this controlling lever 16 is connected to the movable stop 9' by means of a connecting rod 90'.

The stop 9' is movable in translation relative to a fixed plate 12, parallel to the axis of movement of a slider 14 connected to the end of the accelerator cable 1.

The degree of maximum opening of the air inlet flap 5 is therefore conditioned by the position of the stop 9', controlled by the actuator 10'.

More specifically, in the released position of FIG. 9, the return spring 8' acts on the slider 14 to bring it back to a rest position (to the left in the figure). The slider 14 has a notch 141, receiving a first end of the tie rod 15. The movement to the left of the slider 14 causes the movement substantially in the same direction of the tie rod 15, the second end of which rotates the lever 4', and therefore the flap 5 which is movable in rotation along the same axis.

Thus, under the effect of the return spring 8', the flap 5 closes.

When the driver activates the accelerator pedal, the accelerator cable is stretched (FIG. 10). It drives the slider 14 to the right in the figure, and simultaneously stretches or lengthens the return spring 8' (so that it brings the slider to the left as soon as the accelerator pedal is released or relieved).

In FIGS. 9 and 10, the stop is in a position corresponding to an intermediate state. To switch to a state of penalty (or reduction of the maximum power), the lever 16 is moved in the counter-clockwise direction, driving the stop 9' to the left in the figures. To switch to a state of bonus (or increase in maximum power) the lever 16 is moved in the clockwise direction.

FIG. 10 allows to distinguish two phases:

- in a first phase, the acceleration works conventionally: the action on the accelerator cable 1 moves the slider 14 to the right in the figure, and the tie rod 15 follows the same movement, its first end 15A remaining in contact with the notch 141 of the slider 14, and therefore ensures the opening of the shutter 5, via the lever 4'. The compensation spring 6 connecting the slider 14 to the lever 4' maintains a tension substantially unchanged during this phase and ensures that the first end of the tie rod 15 is kept in contact with the notch 141. As soon as the cable 1 is released or relieved, the return spring 8' returns the slider 14, which drives the tie rod 15 to control the shutter 4' and reduce the air inlet;
- in a second phase, when the maximum power, adjusted via the actuator 10' and the control it has received, is reached, the first end 15A of the tie rod 15 contacts the stop 9' (situation illustrated in FIG. 10) and is separated from the slider 14 and its notch 141. The slider 14 continues its movement under the action of the cable 1, the driver thus retaining the possibility of acting on the accelerator pedal over the entire range of movement thereof. But the tie rod 15 is stopped by the stop 9'. Consequently, the flap 5 remains stationary, in a position of maximum opening fixed by the stop. In this phase, the compensation spring 6 is stretched, since the lever 4' no longer moves.

It should be noted that the second end 15B of the tie rod is connected to the operating lever 4'.

The adjustment in this second embodiment is similar to the first embodiment, the stop 9' allowing to define the at least three states:

- an intermediate state P0 (illustrated in FIGS. 9 and 10), corresponding to an intermediate level of maximum speed, applied in the absence of a control signal assigning a bonus or a penalty, and causing movement of the actuator 10' so as to place the stop 9' in this intermediate state;
- a state of penalty P1, corresponding to a reduced level of maximum speed/power, the reduced level being lower than said intermediate level, and applied in the presence of a control signal S1 assigning a penalty, and causing a movement of the lever 16 towards the operating lever 4' (to the left in the figures) so as to place the stop 9' in this state of penalty, by reducing the travel of the tie rod 15, and consequently the maximum opening of the shutter 5;
- a state of bonus P2, corresponding to an increased level of maximum speed/power, this increased level being higher than the intermediate level, and applied in the presence of a control signal S2 assigning a bonus, and resulting in a movement of the lever 16 towards the accelerator cable 1 (towards the right in the figures) so as to place the stop 9' in this state of bonus, by increasing the travel of the tie rod 15, and consequently the maximum opening of the flap 5.

More than three states, or only two states are possible. Moreover, for each state, the exact position of the stop can be refined, in real time, periodically or on demand, so that the maximum power is itself adapted precisely.

Although the present disclosure has been described with reference to one or more examples, workers skilled in the art will recognize that changes may be made in form and detail without departing from the scope of the disclosure and/or the appended claims.

The invention claimed is:

1. An internal combustion engine kart comprising:

an engine comprising an air inlet flap;

an accelerator pedal;

an operating lever which is connected to rotate the air inlet flap to control an amount of air entering the engine;

an accelerator cable connecting the accelerator pedal and the operating lever;

a controller configured to receive at least one control signal emitted by a remote transmitter and comprising a movable stop positioned to control movement of said operating lever so as to change a range of movement of the operating lever and consequently a level of maximum opening of the air inlet flap, wherein movement of said movable stop is dependent on said control signal;

a compensation spring mounted in an extension of said accelerator cable, between the accelerator cable or a slider driven by said accelerator cable and the operating lever, said compensation spring acting in tension to lengthen gradually when said operating lever is in contact with said movable stop and a driver continues to press said accelerator pedal, so that ranges of movement of said accelerator pedal are identical regardless of a position of said stop.

2. The internal combustion engine kart according to claim 1, which comprises a feedback loop controlling the position of said movable stop, depending on information representing an instantaneous power and/or an instantaneous speed of said kart.

3. The internal combustion engine kart according to claim 1, wherein said operating lever is movable in rotation about a first axis of rotation.

4. The internal combustion engine kart according to claim 3, wherein said first axis of rotation is common with a second axis of rotation of said air inlet flap.

5. The internal combustion engine kart according to claim 1, wherein said kart can receive bonuses or penalties, resulting respectively in an increase or a limitation of power available to the kart, said stop defining at least three states:

an intermediate state, corresponding to an intermediate level of maximum speed, applied in absence of a control signal assigning a bonus or a penalty;

a state of penalty, corresponding to a reduced level of maximum speed, said reduced level being lower than said intermediate level, and applied in the presence of a control signal assigning a penalty; and a state of bonus, corresponding to an increased level of maximum speed, said increased level being greater than said intermediate level, and applied in the presence of a control signal assigning a bonus.

6. The internal combustion engine kart according to claim 1, wherein said movable stop is mounted at an end of a piston whose movement is controlled by said control controller.

7. The internal combustion engine kart according to claim 1, wherein said operating lever has a first end connected to said compensation spring and a second end that can contact said movable stop.

8. The internal combustion engine kart according to claim 1, wherein said movable stop acts on said operating lever through a tie rod.

9. The internal combustion engine kart according to claim 8, wherein the controller comprises an actuator connected to said movable stop by a lever and/or a connecting rod.

* * * * *